T. L. RIVERS.
Assignor, by mesne assignments, to W. B. GOULD.
Casters.
No. 8,154. Reissued April 2, 1878.
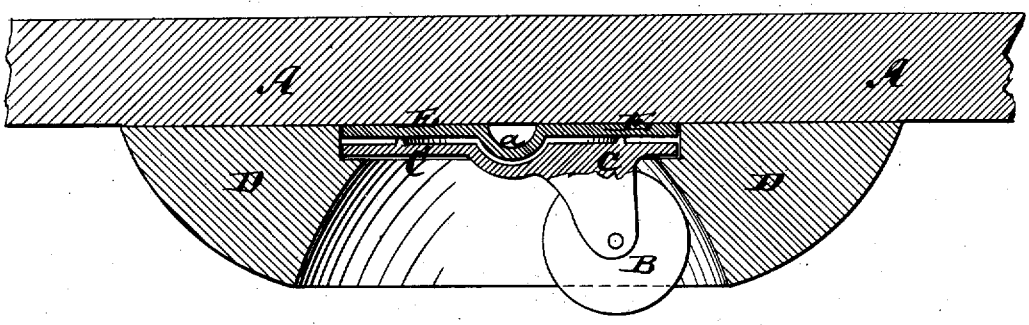
*Witnesses:*
John C. Tunbridge
T. B. Hooker
*Inventor:*
Thomas L. Rivers
by his attorney
A. v. Briesen
N. PETERS, PHOTO-LITHOGRAPHER, WASHINGTON, D. C.

UNITED STATES PATENT OFFICE.

THOMAS L. RIVERS, OF ST. LOUIS, MISSOURI, ASSIGNOR, BY MESNE ASSIGNMENTS, TO WILLIAM B. GOULD, OF NEW YORK CITY.

IMPROVEMENT IN CASTERS.

Specification forming part of Letters Patent No. 91,873, dated June 29, 1869; Reissue No. 8,154, dated April 2, 1878; application filed February 18, 1878.

*To all whom it may concern:*

Be it known that I, T. L. RIVERS, of the city of St. Louis, county of St. Louis, and State of Missouri, have invented a new and Improved Caster for Trunks, &c., of which the following is a specification:

The drawing represents a vertical central section of my improvement in casters for trunks, &c.

This invention relates to a new manner of applying casters to the bottoms of trunks or other articles, and of protecting the sides of said casters against injury by an attachment to the under side of the trunk, through which attachment the roller is inserted from above. In fact, the invention consists in passing the caster from above through a mortised plate, and resting it on said plate between the top thereof and the bottom of the trunk, substantially as hereinafter specified and shown.

The letter A in the drawing represents the bottom of a trunk or other device to which the caster is to be attached. The letter B represents the roller of the caster, hung in ears that project from a plate, C. D is a ring or plate attached to the under side of the trunk, and mortised to admit the roller. The plate C is first placed upon the plate D, so as to cause the roller to pass through and into the mortise of said plate, beyond which it projects downwardly, as shown, and thereupon the latter is secured to the under side of the trunk, so that thus the plate C will be confined between the plate D and the bottom of the trunk. E is another plate, of about the size and diameter of the plate C, and interposed, when used, between the plate C and the bottom of the trunk, as shown. It constitutes a washer or bearing-plate for the plate C, and has a downward projection, *a*, over which part of the plate C is bent, as indicated, for the purpose of keeping said plate C and the wheel steady, and to permit them to turn on the projecting base of the plate E.

Thus it will be seen that the caster is fully protected at the sides by the mortised plate D, which partly surrounds it.

I claim—

1. The combination of the trunk-bottom A, roller B, and roller-plate C, to which the roller is attached by ears, with the mortised plate D, through which the roller is passed from above, and which is attached to the under side of the trunk, substantially as herein shown and described.

2. The combination of the plate C, to which the roller is attached by ears, and roller B with the mortised plate D, for attachment to a trunk, substantially as specified.

3. The combination of the roller B and its attached plate C with the mortised surrounding plate D and bearing-plate E, substantially as and for the purpose specified.

THOMAS L. RIVERS.

Witnesses:
A. J. PECK,
J. C. THOMA.